(12) United States Patent
Senderak

(10) Patent No.: US 8,397,319 B1
(45) Date of Patent: Mar. 19, 2013

(54) ADD-ON FLUSH CONTROL MECHANISM TO PROVIDE WATER CONSERVATION

(76) Inventor: Michael Peter Senderak, Collegeville, PA (US)

( * ) Notice: Subject to any disclaimer, the term of this patent is extended or adjusted under 35 U.S.C. 154(b) by 0 days.

(21) Appl. No.: 13/207,380

(22) Filed: Aug. 10, 2011

Related U.S. Application Data

(60) Provisional application No. 61/444,109, filed on Feb. 17, 2011.

(51) Int. Cl.
*E03D 1/00* (2006.01)
(52) U.S. Cl. ...................................... 4/415; 4/393; 4/399
(58) Field of Classification Search .............. 4/355–357, 4/381, 358, 391–395, 399, 415
See application file for complete search history.

(56) References Cited

U.S. PATENT DOCUMENTS

| | | | | |
|---|---|---|---|---|
| 2,726,403 A | * | 12/1955 | De Gree | ............................ 4/393 |
| 3,795,016 A | | 3/1974 | Eastman | |
| 3,908,203 A | * | 9/1975 | Jackson | ............................ 4/324 |
| 4,117,556 A | | 10/1978 | Semler | |
| 4,388,736 A | | 6/1983 | Roosa et al. | |
| 4,536,900 A | * | 8/1985 | Hayes | ............................... 4/324 |
| 4,624,018 A | * | 11/1986 | Kurtz | ................................. 4/325 |
| 4,945,580 A | | 8/1990 | Schmitt et al. | |
| 5,191,662 A | * | 3/1993 | Sharrow | ........................... 4/325 |
| 5,205,000 A | * | 4/1993 | Xia et al. | ........................ 4/324 |
| 5,319,809 A | | 6/1994 | Testa | |
| 2009/0126094 A1 | | 5/2009 | Laube | |

* cited by examiner

*Primary Examiner* — Huyen Le
*Assistant Examiner* — Erin Deery

(57) ABSTRACT

A water-saving flush valve control mechanism is formed as a single unit that can easily be retrofitted onto existing toilet architectures with only one fixed attachment point. Water usage is reduced by providing the user full control in opening and closing the buoyant water valve. Control is achieved by a vertical rigid spine that is attached between the toilet handle arm and the valve. An adjustable lateral extension is included and placed between the toilet handle arm and the vertical rigid spine to ensure that the spine is properly positioned over the valve. Pivotable attachment of the spine to the lateral extension accommodates the arcing pathway of the buoyant valve. A float arm may be added and used to counterbalance the additional weight associated with the flush valve control mechanism.

5 Claims, 8 Drawing Sheets

ADD-ON FLUSH CONTROL MECHANISM TO PROVIDE WATER CONSERVATION

CROSS-REFERENCE TO RELATED APPLICATIONS

This application claims the benefit of U.S. Provisional Application No. 61/444,109 filed Feb. 17, 2011.

TECHNICAL FIELD

The present invention relates to a water conservation mechanism for flush toilets and, more particularly, to the combination of a vertical rigid member and a lateral extension arm that may be easily added onto conventional flush mechanisms and used to re-seat a flapper valve at any point during the flush cycle by moving the exterior flush handle upwards towards its original position.

BACKGROUND OF THE INVENTION

Up to the present day, the primary design objective in the manufacture of household toilets in the United States has been to deliver the same fixed volume of water during each flush, sufficient to completely remove any typical solid or liquid waste that may be deposited in the toilet bowl. The standard toilet consists of a water tank and a valve that releases essentially the full volume of water in the tank into the toilet bowl. Pressing the external flush handle lifts a buoyant flapper-type (or bulb-type) valve that is located along the bottom of the tank. This standard flushing approach offers simplicity and cost savings in construction and manufacture, while at the same time meeting essentially all toilet waste removal demands of the typical household. However, because liquid waste removal in particular, and often solid waste removal as well, requires only a fraction of the water stored in the toilet tank, the single-flush design results in a significant waste of water.

With increasing emphasis placed on water conservation in the past decades, "dual-flush" toilets have become an increasingly available option in the market targeting household consumers. Such toilets allow users to select between a "full" flush using the complete volume of water in the tank and a "partial" flush (for liquid waste, for example) that requires only a partial volume of water for adequate waste removal. These toilets, while more complicated in design and cost, can offer significant savings in water consumption, reducing homeowner utility costs in the long run and particularly benefiting regions and localities facing water shortages.

While dual-flush toilets substantially eliminate the wasteful water consumption associated with the currently prevailing single-flush toilet design, consumers face significant disincentives to utilizing them. Even for those households that wish to contribute to the water conservation effort, the purchase and installation price of a dual-flush toilet can be substantial, up to three times the cost of a standard toilet, or more. In addition, for the typical household, the return on investing in a dual-flush toilet could take years of cost savings through water conservation. Also, any interest in benefitting from a dual-flush toilet is likely diminished by the fact that the household's current standard toilet meets their toileting needs equally well, albeit with less efficiency in water usage.

In response to the growing interest in water conservation, and given the still limited and costly consumer choices for alternative dual-flush toilets, a number of designs for modifying the standard single-flush toilet have been proposed. These designs generally fall within two classes of prior art.

The first class includes designs requiring substantial modification or replacement of existing structures within the standard single-flush toilet, while the second class comprises retrofit kits require little or no modification or replacement of the standard flushing components. A common drawback of the first class of designs is the need for tools and a mechanical ability that most households do not possess or care to acquire. An example of such a design is proposed in U.S. Pat. No. 3,795,016, entitled "Toilet Water Tank with Light and Heavy Flush Control", issued to E. A. Eastman on Mar. 5, 1974. In this arrangement, the single water outlet valve at the base of a standard toilet tank is replaced by a set of two valves, positioned at different water levels within the tank. Opening only the upper valve results in a partial flush, thus limiting the quantity of water released into the toilet bowl. This dual valve design type also requires an accompanying linkage system to selectively open the two valves, with design variations involving either the single handle of the standard toilet, or requiring the use of two separate handles. This particular design has the additional disadvantage of reducing the water column above the elevated partial flush valve, thereby reducing the water pressure available for efficiently removing wastewater from the toilet bowl. As a result, more water may be required to efficiently remove liquid waste.

The second class of prior art designs (comprising add-on kits that retrofit onto existing single-flush toilets) require little or no modification to the existing structures. However, these designs generally suffer from one or more of the following drawbacks: a) many are of complex design and are therefore more costly to manufacture; b) require tools to install; c) are difficult to retrofit onto standard toilet components; d) offer operational reliability for only a limited variety of single-flush architectures; e) offer limited water conservation, even during reliable operation; and/or f) require the toilet user to learn and apply a new procedure for flushing the toilet.

One exemplary retrofit design type involves the installation of a dual-flush linkage connected to the standard flush handle. This arrangement is disclosed in U.S. Pat. No. 5,319,809, entitled "Dual Mode Flush Mechanism for Toilets", issued to E. J. Testa on Jun. 14, 1994. In this case, Testa proposes a mechanism that allows a full flush by pressing the handle downward in the normal fashion for solid waste removal, while pulling upward on the handle to initiate a partial flush, the upward motion going toward a preset stop point that partially opens the flapper-type valve at the base of the water tank. Since the partial lifting of the flapper-type valve prevents its buoyant tendency to float as the water level reaches the bottom of the tank, releasing the flush handle immediately re-seats the valve. Therefore, the amount of water consumed by the flushing action is controlled by the user. However, this design approach suffers from a number of drawbacks. In particular, the Testa mechanism consists of a double-cam and lever system containing multiple moving parts, limiting its economy of manufacture. Additionally, installation requires tools and the disassembly of the standard handle linkage. Also, since the Testa partial flush method relies on incompletely opening the water-release flapper-type valve, the water pressure available from the water column above the flapper-type valve is not fully utilized for efficiently removing wastewater from the toilet bowl. Consequently, more water in the tank may need to be released to effective removal of the liquid waste.

Variants on this design approach replace the complex cam linkage system with a simpler stop-point mechanism that incompletely opens the flapper-type valve for both partial and full flush operation. The toilet user simply presses and holds down the toilet handle for a longer period of time to achieve a full flush. However, in this design approach, the full flush (as well as the partial flush) fails to utilize the full water pressure head available above the valve. As a result, the removal of solid waste (which is especially reliant on a high-pressure flush) also requires excess water usage and may fail to completely evacuate the waste from the toilet bowl. Additionally, the toilet no longer operates in its stand manner in that the standard full flush is no longer automated with a simple press and release of the handle. This approach therefore requires relearning and additional effort by household members, and can be confusing to household guests.

Other retrofit design concepts rely upon the premature removal of the flapper-type valve's buoyancy to halt the water flow from the tank and into the bowl, and thereby achieve a partial flush. For example, U.S. Pat. No. 4,945,580 entitled "Volume-Selective Water Closet Flushing System" and issued to M. M. Schmitt et al. on Aug. 7, 1990, proposes a flexible tube that is inserted into the buoyant chamber of the flapper-type valve, with the other end fixed to a pressure release valve above the water level. The air tube assembly is accompanied by an installed linkage between the flush handle and the valve system, allowing the user to selectively activate the air tube passageway for a partial flush by pressing the toilet handle in the prescribed manner. When a partial flush is selected, the pressure release valve opens and thereby allows the water pressure at the level of the flapper-type valve to force the air from the buoyant chamber out through the tube, filling the chamber with water and causing the valve to fall back down into its closed position. Depending on the prior art variations within this design concept, drawbacks can include component complexity and installation requirements for the linkage, valving, and tube components. Additionally, the weight, placement, elasticity, and position of the air tube attached to the flapper-type valve can unbalance the valve's buoyant force that regulates its proper closure.

Other prior art retrofit designs rely on mechanical rather than hydraulic methods for automatically closing the flapper-type valve prematurely at a preset water level to achieve a partial flush. For example, the arrangement disclosed in U.S. Pat. No. 4,117,556 entitled "Flush Water Conserver" and issued to O. A. Semler on Oct. 3, 1978, suspends a downwardly-slidable float unit above the water release valve. With the appropriate manipulation of the flush handle, a latching system either allows the float to descend and prematurely force the water release valve closed, or instead prevents the float's descent to allow a full flush to complete. The Semler design requires several linkages and moving parts, reducing its economy of manufacture and reliability of operation. Additionally, as with all designs that allow for only two preset levels of water usage, the degree of water conservation achieved is limited during the removal of solid waste. While nearly all liquid waste deposits can be efficiently removed with a single pre-selected volume of water for the partial flush, the amount of water required to efficiently remove solid waste varies depending on the consistency, amount and size of solid waste matter deposited, and is often less than the amount used in a full flush. Consequently, one pre-set full flush volume often uses excessive amounts of water. It is also been found that the minimal partial flush water volume associated with the removal of liquid waste is often more than sufficient for also removing solid waste material. In general household practice, the amount of water required for solid waste removal will vary between the minimal required for liquid waste removal and the full flush volume. Consequently, prior art dual-flush designs offering only a single preset full flush volume will often consume more water than required in solid waste removal.

Another class of retrofit devices addresses the problem of excess water usage during solid waste removal by giving the toilet user full operational control in closing, as well as opening, the flapper-type water valve. In these designs, the act of lifting the toilet handle lifts open the valve, while releasing or moving the handle in the opposite direction replaces the valve in its closed position. The toilet user can select any volume of water for eliminating liquid or solid waste. In addition, these designs eliminate design complexity by avoiding multiple-component linkage systems intervening between the toilet handle and the flapper-type valve, often replacing them with a direct rigid connection. For example, U.S. Pat. No. 4,536,900 entitled "Water Conserving Flush Valve for Toilets" issued to G. P. Hayes on Aug. 27, 1985 proposes a cable attachment from the flush handle arm to a lever resting above the flapper-type valve. Pressing the handle lifts the valve in the standard manner, while returning the handle to its resting position lowers the level via cable connection to press the valve closed. However, while this design avoids the complex linkages of the previously-described prior art, it does require correct placement of several components at multiple attachment points, as well as several moving parts, and further includes an awkwardly-placed cable conduit that can impede reliable valve control. U.S. Pat. No. 4,388,736 entitled "Tank Flushing Means" and issued to P. V. Roosa on Jun. 21, 1983 proposes an alternative arrangement using a single rod connecting the flush handle arm directly to the flapper-type valve. Attached to the rod is a float resting directly above the valve to counteract the added weight of the device and flush handle arm, such that buoyancy is maintained when the handle is released for a full flush. This design also suffers from a number of flaws. Many flapper-type valves do not have an eyelet for attachment to the hooked end of the rod, making installation difficult or impractical, especially for valves made of hard plastic at this connection point. Additionally, because the float rests above the valve, buoyancy is lost at water level higher than that reached in a standard full flush, resulting in an incomplete full flush. Additionally, the design operates reliably only for standard toilet designs that allow the control rod to be connected to the toilet handle arm directly above the flapper-type valve. To the extent that the flush handle deviates from this direct position, the downward force of the rod pushes obliquely on the valve, causing improper valve seating or complete valve failure. US Patent Publication 2009/0126094 entitled "User-Controlled Water Saving Toilet", authored by S. G. Laube and published on May 21, 2009 proposes several types of direct linkage between the flush handle and the flapper-type valve, including chain links, rigid bars, rigid tubes, springs and various combinations thereof. However, these approaches are subject to the same drawbacks of lost full-flush buoyancy and oblique force against the flapper-type valve.

SUMMARY OF THE INVENTION

The needs remaining in the prior art are addressed by the present invention, which relates to a water conservation mechanism for flush toilets and, more particularly, to the combination of a vertical rigid member and a lateral extension arm that may be easily added onto conventional flush mechanisms and used to re-seat a flapper valve at any point during the flush cycle by moving the exterior flush handle upwards towards its original position.

In particular, the present invention relates to a water-conserving flush valve control mechanism for a toilet of the type generally having a water reservoir, an outflow orifice that discharges into a toilet bowl located below, a pivotally-operated flapper-type valve seated on the outflow orifice, a flush handle disposed external to the water reservoir, a flush handle extension disposed within the reservoir and coupled to the flush handle, and an original linkage disposed between the flush handle extension and the flapper-type valve to control the movement of the flapper-type valve with respect to said outflow orifice by operation of the flush handle. The water-conserving flush valve control mechanism is formed as an add-on linkage disposed between the flush handle extension and the flapper-type valve for urging the flapper-type valve directly downward along its natural arc of motion by returning the flush handle to its original pre-flush position, regardless of whether the flapper-type vale is directly below or laterally displaced from the flush handle extension.

A preferred embodiment of the present invention utilizes a lateral extension arm disposed between the conventional flush handle extension and the vertical rigid spine member to ensure that there is a proper alignment between the vertical rigid spine member and the flapper-type valve (eliminating the possibility of the application of an oblique force). The lateral extension arm is coupled to the flush handle extension in a manner that allows for the arm to be moved back and forth in the horizontal plane, adjusting the position of the attached vertical rigid spine member with respect to the flapper-type valve. Additionally, it is preferred that the relative positioning of the vertical rigid spine member along the lateral extension arm be adjustable, thus accommodating different arrangements of components from one toilet configuration to another, and that the orientation of the vertical rigid spine be constrained to follow the natural arc of the flapper-type valve.

A further preferred embodiment of the present invention includes an additional buoyancy member, attached to the vertical rigid spine member, which accommodates for the additional weight associated with the spine member. Importantly, the buoyancy member is adjustable along the vertical rigid spine member such that the floats of the buoyancy member can be positioned at the same level as the flapper-type valve. This positioning ensures that the full volume of water used in the manufacturer's standard full flush is utilized when the apparatus of the present invention is used to deliver a full flush.

Accordingly, several advantages of one or more aspects of the present invention include the ability to provide a retro-fit add-on unit that converts a full-flush toilet to a water-conserving, fully adjustable flush level toilet by giving the user complete control over when to open and close the flapper-type valve. The user operates the toilet in the same manner as a standard full-flush toilet in terms of pushing down the handle and releasing to initiate a standard full flush, while also now having the added option of pulling up on the handle to stop the flush. The arrangement of the present invention comprises a single unit that requires only one fixed attachment point (along the flush handle extension) for economy of manufacture, operational reliability and ease of installation. Moreover, the arrangement of the present invention can be readily installed by a household member without tools and does not require the removal, replacement or substitution of any pre-existing toilet components, providing reliable operation and consistent positive valve closure across a variety of toilet architectures.

Other and further features and advantages of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
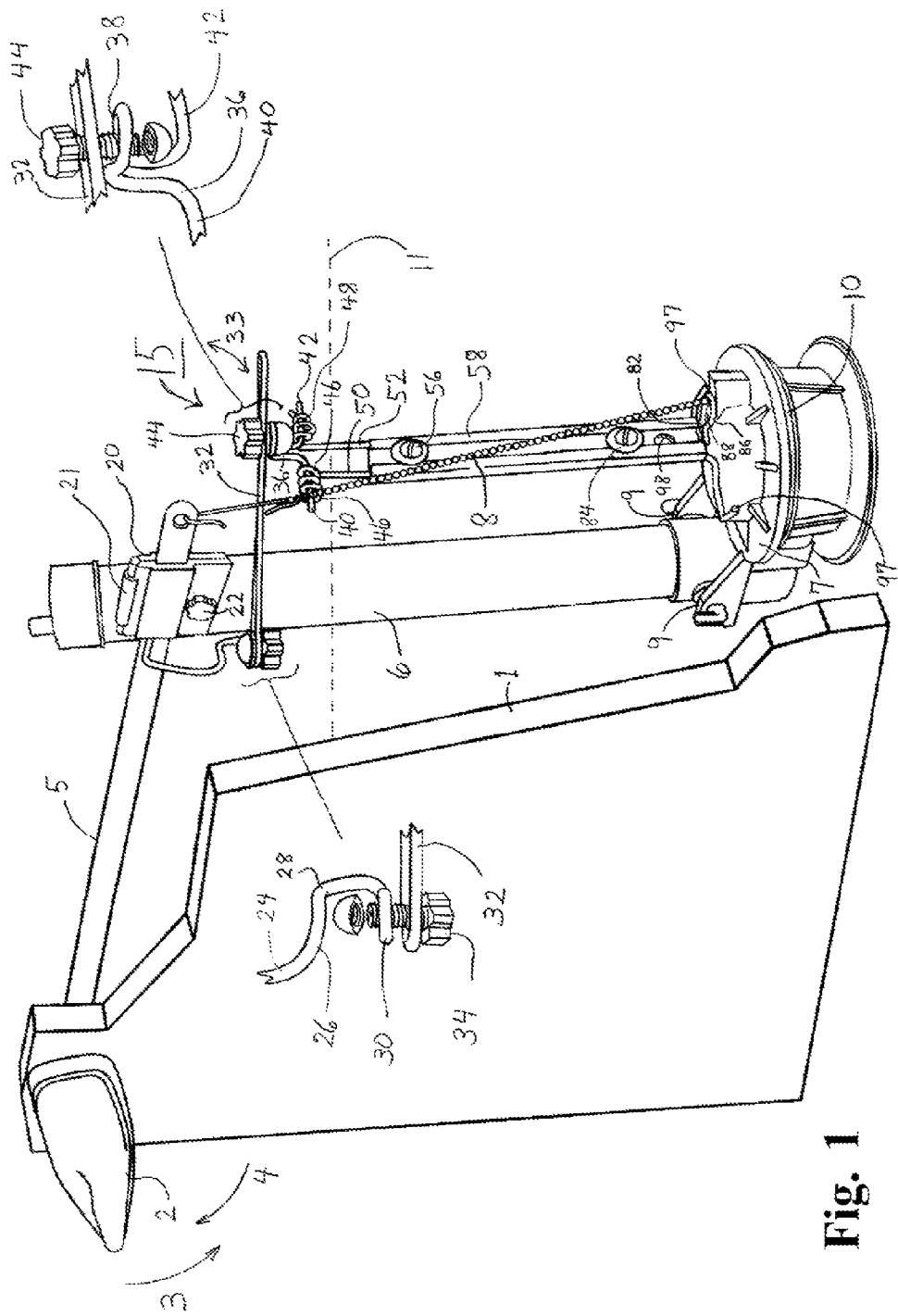
FIG. 1 is a partial cutaway view of a conventional toilet tank, illustrating one exemplary embodiment of a water-conserving flush valve control mechanism of the present invention.

FIG. 1 is a cutaway view of a conventional toilet water reservoir tank 1 including a flush valve control mechanism 15 formed in accordance with the present invention. As shown, tank 1 comprises the following standard features: an external toilet flush handle 2, a flush handle extension 5 disposed within tank 1 and coupled to flush handle 2, an overflow tube 6, a water release flapper-type valve 7, a pull chain 8 (generally, any type of linkage that allows for the opening of valve 7 via handle 2), and a pair of valve pivot points 9. Also shown in FIG. 1, a conventional toilet flush mechanism includes a valve seat 10 disposed over an outlet orifice 12 formed in the base of tank 1 (orifice 12 best shown in FIG. 9). All of these components (excluding flush valve control mechanism 15) are conventional elements and well-known in the prior art.

In its conventional operation as a full-flush toilet, the above-described arrangement functions by pressing handle 2 downward in the direction of arrow 3, which upwardly lifts handle extension 5 and attached chain 8, thereby rotating flapper-type valve 7 upward about pivot points 9 (located on opposing sides of overflow tube 6). By unseating valve 7, the water in tank 1 will begin to flow through orifice 12 and into the associated toilet bowl (not shown). Once valve 7 has been lifted, handle 2 and chain 8 have no further control in moving valve 7, where due to its buoyant nature, valve 7 will remain elevated in its open position until the water level (indicated as line 11 in FIG. 1) falls sufficiently such that the weight of valve 7 overcomes its buoyancy and it returns to its closed position by engaging with valve seat 10. Unrelated to the subject matter of the present invention, water is then re-supplied to tank 1 in readiness for the next flush cycle via components not illustrated in the arrangement of FIG. 1.

Without interrupting this conventional full-flush operation of a standard toilet, flush valve control mechanism 15 of the present invention may be installed as a retrofit add-on to enable the user to control the duration of a flush at any time during the flush cycle. In particular, water-conserving flush valve control mechanism 15, as shown in the embodiment of FIG. 1, provides a rigid connection between flush handle extension 5 and valve 7, where the movement of the rigid connection functions to close the valve by manually returning handle 2 in the direction of arrow 4 to its original position.

As shown, flush valve control mechanism 15 includes a vertical rigid spine 58 that is disposed between flush handle extension 5 and valve 7 to provide this desired action and a lateral extension arm 32 that is coupled between the upper termination of vertical rigid spine 58 and flush handle extension 5. Lateral extension arm 32 is used to properly locate vertical rigid spine 58 with respect to valve 7 in the manner described in detail below. Additionally, flush valve control mechanism 15 includes a clamp 20 that is used to attach a clamp arm 24 to a first end of lateral extension arm 32. Indeed, clamp 20 is the only portion of the mechanism of the present invention that needs to be attached to the pre-existing apparatus, where this attachment is simple (generally comprising a locking thumb-screw attachment arrangement 22) and does not require the use of any tools. In particular, clamp 20 may be hinged (shown as hinge spine 21 in FIG. 1) so as to open along one end for convenient mounting over flush handle extension 5 without the need to remove chain 8 from the apparatus. Preferably, clamp 20 is located along flush handle extension 5 as close as possible to the connection to chain 8.

Clamp arm 24 and all other wire components forming flush valve control mechanism 15 are preferably formed of a non-corrosive material of sufficient strength and rigidity to transmit adequate force for overcoming the buoyant force of valve 7. For example, aluminum or brass rods are generally suitable for this purpose, as are solid lengths of suitably strong and rigid material, such as (but not limited to) molded plastics.

Referring again to FIG. 1, clamp arm 24 is shown as attaching to lateral extension arm 32 via a horizontal eye 30 formed at the lower termination of clamp arm 24, as shown in the exploded view of the lower portion of clamp arm 24 and horizontal eye aperture 30 in FIG. 1. A pair of right-angle bends 26 and 28 may be included along clamp arm 24 to ensure that lateral extension arm 32 is displaced below flush handle extension 5 in a fashion that does not interfere with the conventional operation of flush handle extension 5.

In a preferred embodiment, lateral extension arm 32 attaches to clamp arm 24 via a locking screw 34 that feeds through horizontal eye 30 (also shown in the above-referenced exploded view). The use of the combination of horizontal eye 30 and locking screw 34 allows for lateral extension arm 32 to be rotated in a horizontal plane (shown by double-ended arrow 33) so as to properly align vertical rigid spine 58 above valve 7. That is, locking screw 34 is left slightly loosened so that lateral extension arm 32 can be moved back and forth (horizontally) until alignment is achieved; once the components are aligned, locking screw 34 is tightened. It is considered an advantage of flush valve control mechanism 15 of the present invention that the ability to adjust the horizontal alignment of vertical rigid spine 58 with valve 7 allows for flush valve control mechanism 15 to be used with various standard configurations of toilet components without the worry of applying an obliquely directed pressure to close valve 7.

In a preferred embodiment of the present invention, the position of vertical rigid spine 58 along lateral extension arm 32 is also adjustable. Referring to FIG. 1, a hanger 36 is used to support vertical rigid spine 58 and is slidably attached to lateral extension arm 32 via a locking screw 44. In particular, hanger 36 includes a horizontal eye 38 through which locking screw 44 is inserted and attached to lateral extension arm 32 (shown in a separate exploded view in FIG. 1). In use, therefore, hanger 36 may be moved along lateral extension arm 32 until vertical rigid spine 58 is properly located with respect to valve 7. When the desired alignment is achieved, locking screw 44 is tightened and the separation between a first end of lateral extension arm 32 and vertical rigid spine 58 is fixed.

In accordance with the present invention, vertical rigid spine 58 pivots upwards so as to ride against and remain in contact with valve 7 as it lifts from orifice 12 in normal operation. Referring to FIG. 1, the pivotal motion of vertical rigid spine 58 is provided via hanger 36. In this particular embodiment, hanger 36 is shown as including a pair of horizontal hinge pins 40, 42. Vertical rigid spine 58 is formed to include a pair of extender arms 50, 52 that extend as the upper termination of vertical rigid spine 58 and thereafter bend in perpendicular fashion to create horizontal hinge barrels 46 and 48 that engage with hinge pins 40 and 42, respectively. This combination thus provides the pivoting movement of vertical rigid spine 58 to follow the movement of valve 7. As mentioned above, the specific vertical plane of pivot is selectable by rotating hanger 36 at the point of contact between eye 38 and lateral extension arm 32 (as then locked into position by locking screw 44). A set screw 56 may be disposed along vertical rigid spine 58 and used to allow for adjusting the length of extender arms 50, 52.

In further accordance with the present invention, the conventional pull chain 8 is encircled by the lower termination of vertical rigid spine 58 in a manner that allows for conventional operation of a flush operation. In the embodiment as shown in FIG. 1, vertical rigid spine 58 includes a shoe bracket 82 along its lower termination, where shoe bracket 82 is used to encircle pull chain 8 without impeding its movement. Preferably, shoe bracket 82 is movable between "open" and "closed" closed positions by sliding along vertical rigid spine 58. A locking screw 84 is included along vertical rigid spine 58 to control this slidable movement of shoe bracket 82 along spine 58. As shown in the detailed drawing of FIG. 2, shoe bracket 82 includes a bend termination 86 that forms a horizontal shoe aperture 88, where pull chain 8 passes through aperture 88. A pair of guide wings 97 (best shown in FIG. 3) also extend from the lower termination of vertical rigid spine 58, preferably in a direction opposite to aperture 88, and are used to contact valve 7 and urge its re-seating when vertical rigid spine 58 is moved in accordance with the present invention. In one embodiment, guide wings 97 are slidably mounted along vertical rigid spine 58 via a locking screw 98.

Figure 2:
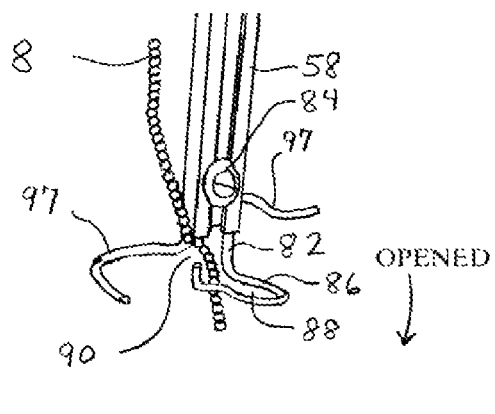
FIG. 2 is an illustration of a portion of a vertical rigid spine of the mechanism of the present invention, showing the associated shoe bracket in the open position.
Figure 3:
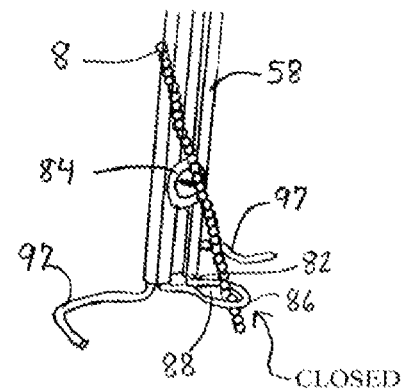
FIG. 3 is an illustration of a portion of a vertical rigid spine of the mechanism of the present invention, showing the associated shoe bracket in the closed position.

FIGS. 2 and 3 illustrate the lower portion of vertical rigid spine 58 and illustrate the movements used to capture and encircle pull chain 8. FIG. 2 illustrates the configuration in the "open" position, that is, where shoe bracket 82 is lowered with respect to vertical rigid spine 58, showing a chain entry gap 90. In this position, pull chain 8 can be inserted into aperture 88 without the need to remove chain 8 from valve 7. Once chain 8 is encircled, shoe bracket 82 may be slidably raised along vertical rigid spine 58, as shown in FIG. 3, allowing for pull chain 8 to remain free during normal flush operations. Once shoe bracket 82 has been returned to the "closed" position, locking screw 84 will hold shoe bracket 82 in place by closing gap 90.

Figure 4:
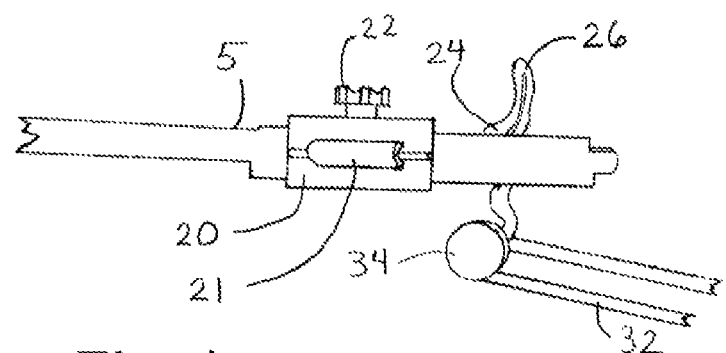
FIG. 4 is a top view of a clamping configuration used as part of the flush valve control mechanism of the present invention, the clamping configuration for attaching the flush valve control mechanism to a conventional flush handle extension.
Figure 5:
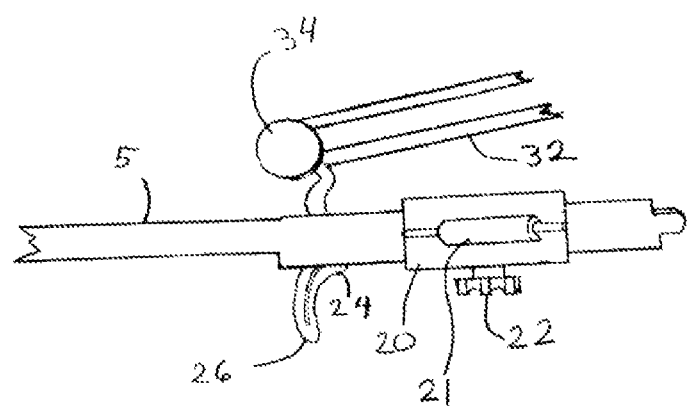
FIG. 5 is a top view of an alternative attachment of the clamping configuration to the conventional flush handle extension.

The following features shown in FIG. 1 allow adjustment of flush valve control mechanism 15 to accommodate a wide variety of full-flush toilet architectures. Right angular bends 26 and 28 allow for vertical rigid spine 58, via sliable attachment along lateral extension arm 32, to be placed in its designated position directly above valve 7 when flush handle extension 5 is directly above valve 7. Bend 26 also allows for displacement of eye 30, at which extension arm 32 is horizontally pivotable, to either side of flush handle extension 5. This is accomplished by reversibly attaching clamp 20 to flush handle extension 5. The reversed attachment configuration is shown in FIG. 4 (as compared to the configurations of FIGS. 1 and 5).

Figure 6:
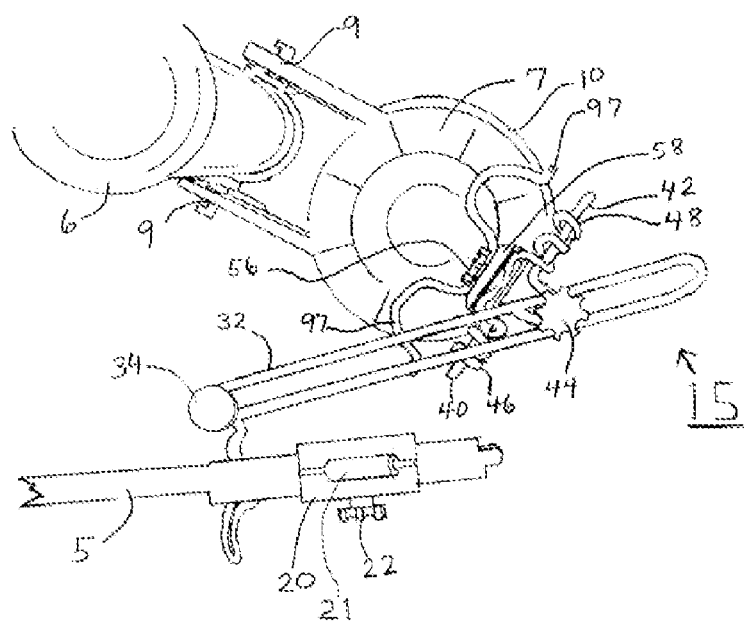
FIG. 6 is a top view of a flush valve control mechanism formed in accordance with the present invention, illustrating a first positioning of the various components (including the vertical rigid spine) so as to properly align with a flapper-type valve.
Figure 7:
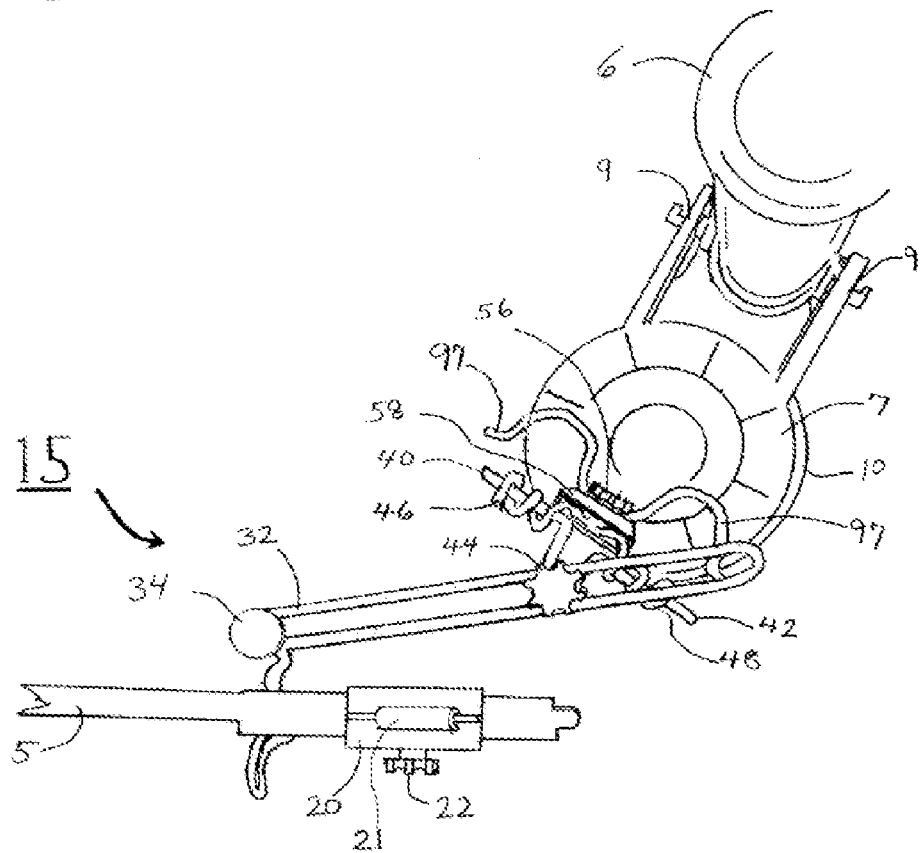
FIG. 7 is a top view of a flush valve control mechanism formed in accordance with the present invention, illustrating a second positioning of the various components (including the vertical rigid spine) so as to properly align with a different architecture of components forming the conventional toilet fixturing.

This dual displacement of the pivot point at locking screw 22, in conjunction with horizontally-rotatable lateral extension arm 32 and the slidable position of vertical rigid spine 58 along lateral extension arm 32, allows for positioning of vertical rigid spine 58 directly above valve 7 for a variety of toilet configurations. FIG. 6 is a top view of flush valve control mechanism 15 as disposed for proper location with respect to a first toilet configuration, where FIG. 7 is a top view flush valve control mechanism 15 is adjusted for a second toilet configuration. In each case, rotation of vertical rigid spine 58 in the horizontal plane at eye 38 allows for the vertical pivoting of vertical rigid spine 58 at points 40 and 42 to occur in the same vertical rotational plane as valve 7 (around its pivot points 9) for proper operation. Slidable positioning of spine extender arms 50, 52 accommodates varying distances between flush handle extension 5 and valve 7.

FIG. 1 shows the proper positioning of flush valve control mechanism 15 within one standard configuration of pre-existing full-flush components, with clamp 20 fixed onto flush handle extension 5 adjacent to the attachment point of pull chain 8 thereto. By way of the adjustments described in the previous paragraph, vertical rigid spine 58 is positioned above valve 7 with aperture 88 of shoe bracket 82 encircling the connection between pull chain 8 and valve 7. Vertical rigid spine 58 pivots at points 40 and 42 in the same vertical plane as valve 7 when valve 7 is raised by chain 8 to pivot at points 9. Spine extender arms 50, 52 are slidably positioned and locked along vertical rigid spine 58 to provide sufficient clearance between shoe bracket 82 and valve 7 when handle 2 is lifted upward and the slack is removed from chain 8 (without lifting value 7 from valve seat 10).

Figure 8:
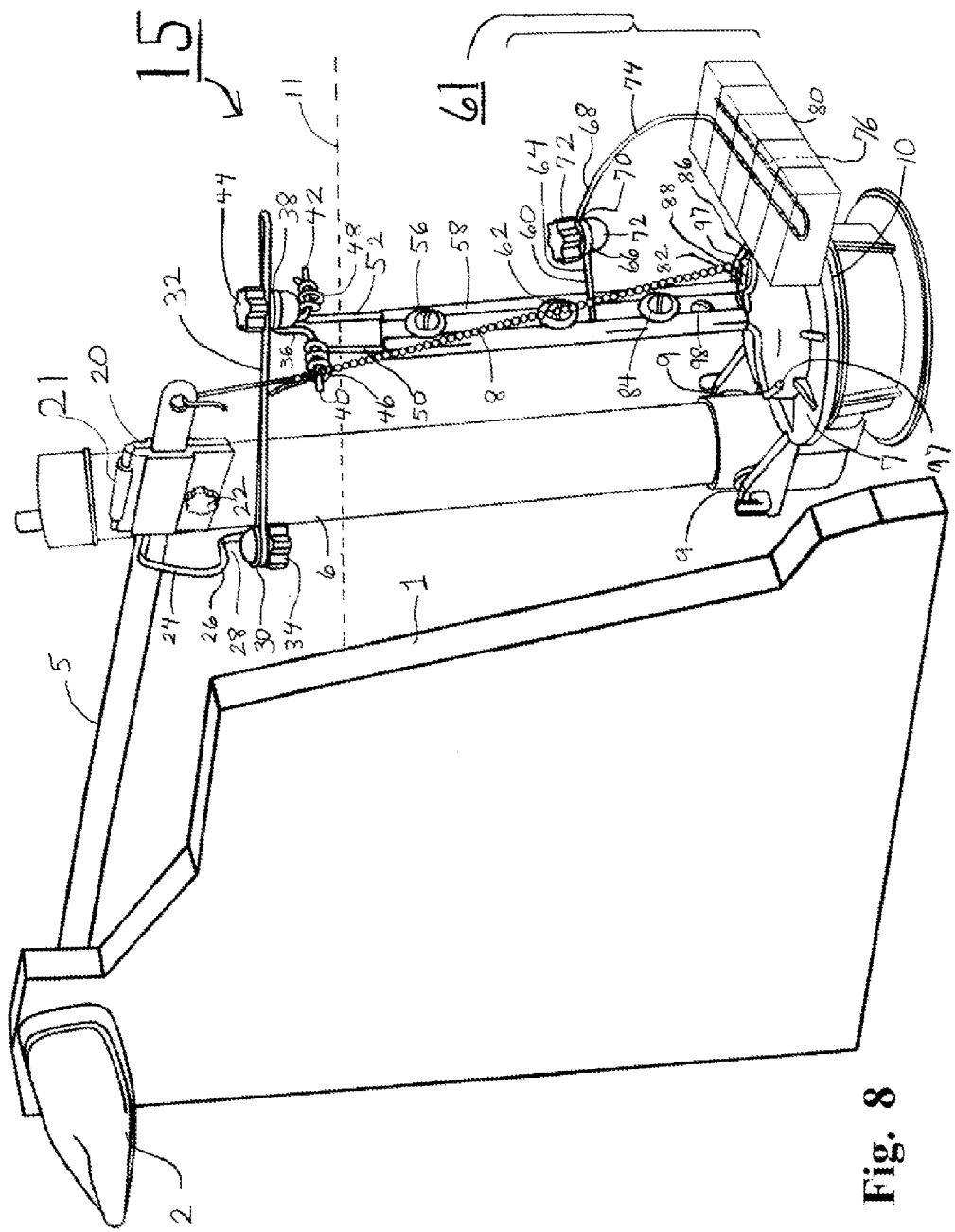
FIG. 8 is a partial cutaway view of a conventional toilet tank, illustrating an alternative exemplary embodiment of a water-conserving flush valve control mechanism of the present invention, this embodiment including a counterbalancing buoyant apparatus positioned at the same level as the flapper-type valve to allow for the equivalent of the manufacturer's standard full flush.

FIG. 8 illustrates an alternative embodiment of the present invention, including a buoyant apparatus 61 as part of flush valve control mechanism 15. Buoyant apparatus 61 is utilized to compensate for the additional weight associated with flush valve control mechanism 15 and includes a float arm bracket 60 that slidably attaches to vertical rigid spine 58 and is locked into a desired position with a locking screw 62. A lateral bend 64 may be included to prevent contact between buoyant apparatus 61 and pull chain 8.

As shown, float arm bracket 60 extends laterally and terminates with a horizontal eye 66 that is pivotally connected to a float arm 68 via a second horizontal eye 70. A locking screw 72 is used to fix the contact between eyes 66 and 70. An arc 74 may be included in float arm 68 to prevent contact between buoyant apparatus 61 and valve 7, where arc 74 terminates in a horizontal float retainer section 76. Sectional floats 80 are frictionally secured to retainer section 76.

The slidable positioning of float arm bracket 60 along vertical rigid spine 58 allows for adjustment of the buoyant force required during routine operation for supporting the weight of flush valve control mechanism 15, as well as pre-existing flush handle extension 5. Additional buoyant control is provided by the individually-removable sectional floats 80. The use of locking screw 72 allows positioning of float arm 68 and floats 80 so as to remain out of the way of movement of the remaining components.

In particular, float arm bracket 60 is adjusted such that sectional floats 80 rest at the level of valve 7, ensuring that valve 7 remains open until the water level drops to the factory pre-set level when a full flush is desired. Replacing or adding sectional floats allows any necessary adjustment for counter-balancing the weight of different designs for flush handle extension 5, as well as the weight of different materials used to form these various components. Raising floats 80 via slidable bracket 60 provides additional counterbalancing adjustment, and also allows the water volume consumed during a full flush to be reduced if the factory set volume is found to be greater than that typically required for complete evacuation of solid waste material.

Figure 9:
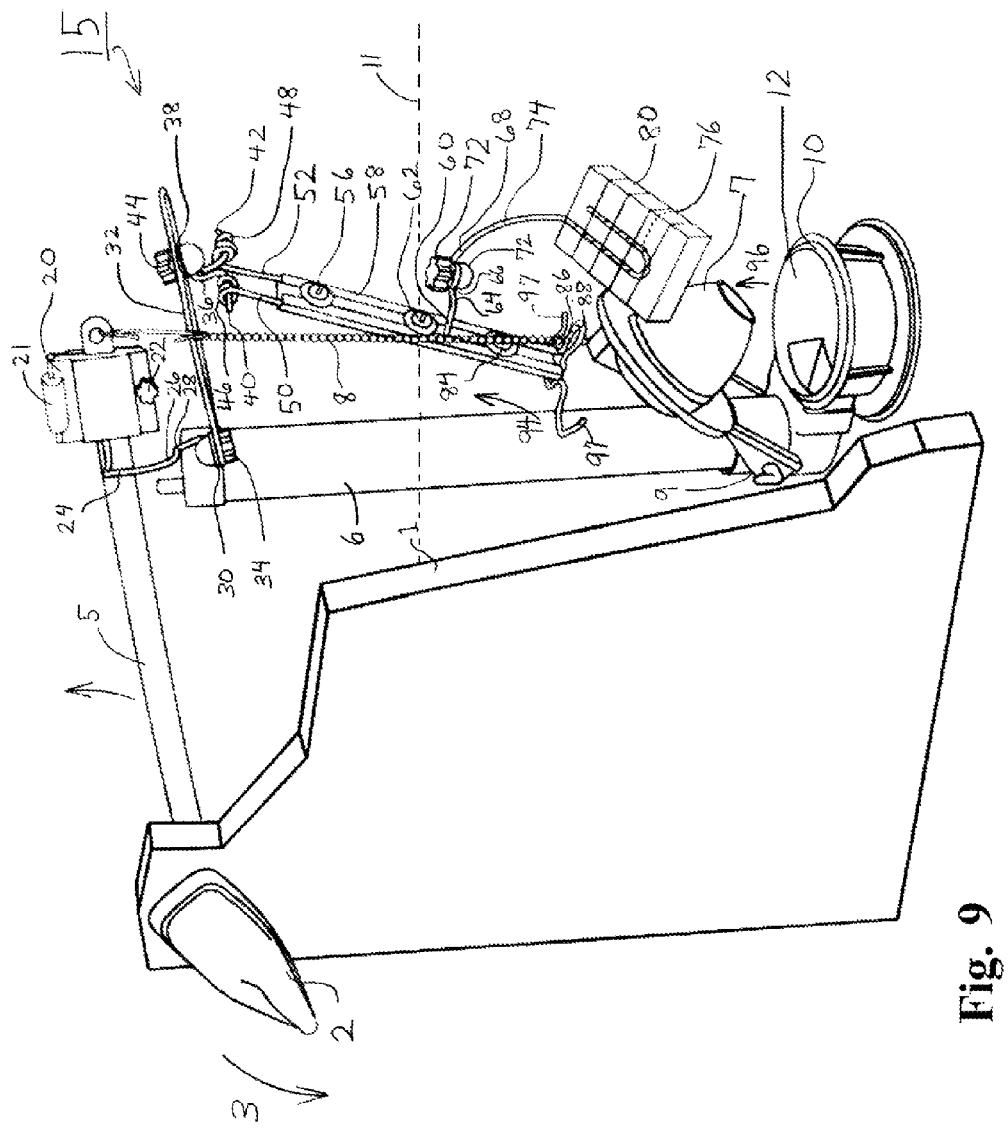
FIG. 9 is a partial cutaway view of a conventional toilet tank, illustrating the raising of the flapper-type valve in response to the conventional lowering (and release) of the handle.
Figure 10:
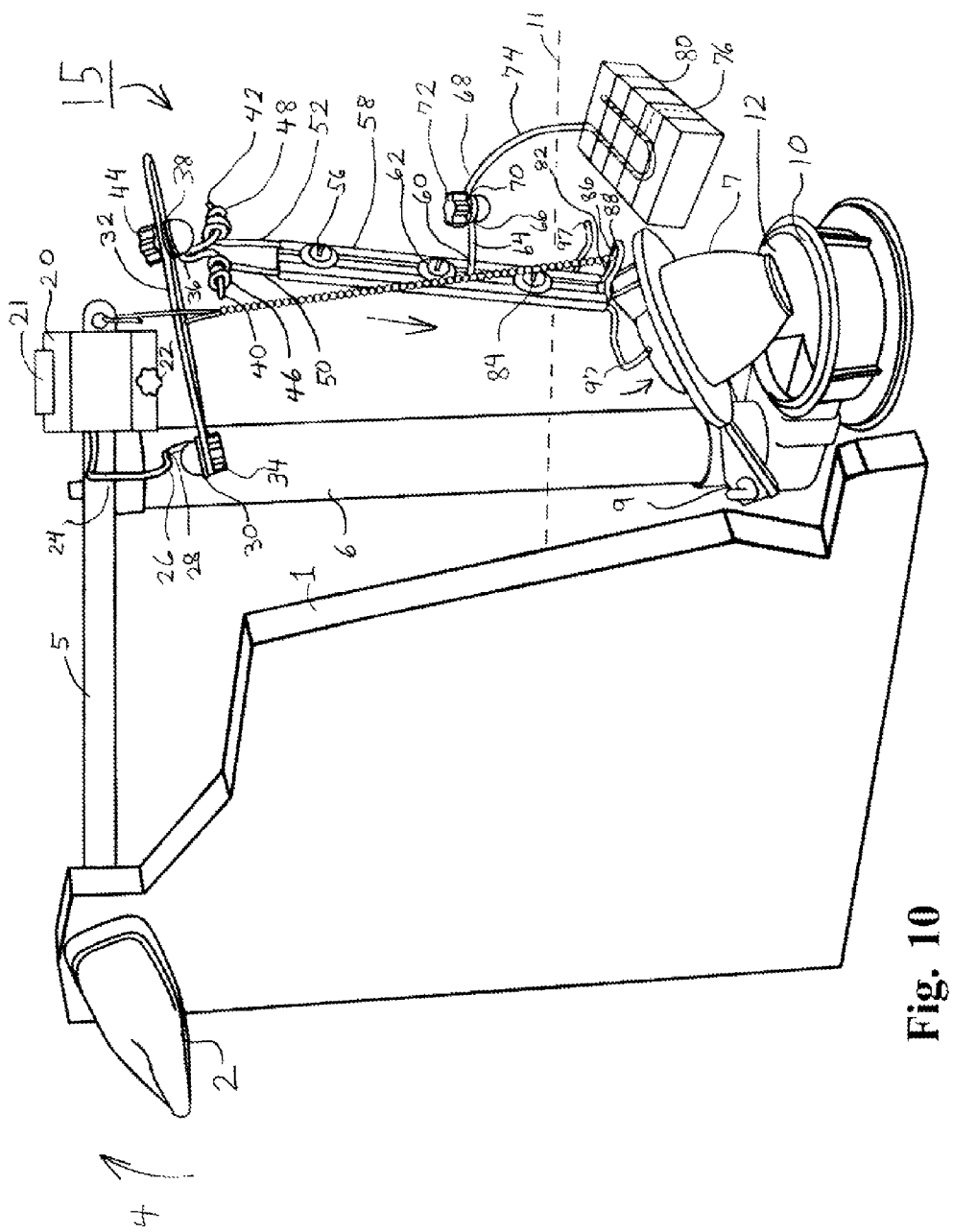
FIG. 10 is a partial cutaway view of a conventional toilet tank, illustrating the lowering of the vertical rigid spine of the valve control mechanism of the present invention in response to the raising of the handle by the user.

The operation of flush valve control mechanism 15 of the present invention is best understood by reference to FIGS. 9 and 10 during the following discussion. When a full flush is desired, the user operates the toilet in the identical, conventional manner as before the inclusion of flush valve control mechanism 15; that is, by pressing handle 2 in the direction of arrow 3 and releasing. Pressing of handle 2 raises flush handle extension 5, pulling chain 8 and thereby raising valve 7 from valve seat 10 to release water into a toilet bowl (not shown). Referring to FIG. 9, during the initiation of a flush, vertical rigid spine 58 is also raised, by way of its fixed attachment to flush handle extension 5 at clamp 20, pivoting at hinge pins 40 and 42 in the direction of arrow 94 to accommodate the rotational movement of valve 7 in the direction of arrow 96.

As discussed above, flush valve control mechanism 15 makes no contribution to the initiation of the flushing process. As long as falling water level 11 remains above elevated valve 7, valve 7 will remain open (due to its buoyancy), as well as the presence of floats 80 (if included) which counterbalance the additional combined weight of flush handle extension 5 and flush valve control mechanism 15 bearing down on valve 7 at shoe bracket 82 as discussed above. As with a conventional toilet, valve 7 closes when water level 11 falls sufficiently to overcome the buoyant force supporting valve 7. Once valve 7 closes, water level 11 then rises to its pre-flush level in preparation for the next flush cycle.

In accordance with the present invention and shown in FIG. 10, when a user desires to implement a partial flush, he returns handle 2 in direction 4 to its original pre-flush position any time after initiating a flush cycle. Referring to FIG. 10, returning handle 2 functions to re-seat valve 7 by the action of vertical rigid spine 58 moving downward against valve 7 at its point of contact with shoe bracket 82. In particular, as handle 2 is returned to its pre-flush position, flush handle extension 5 moves downward, moving vertical rigid spine 58 downward at the same time. Shoe bracket 82 then contacts and urges valve 7 back into place, where valve 7 pivots along pivot points 9 onto seat 10. Guide wings 97 assist as needed by contacting and guiding the lateral edges of valve 7 downward in an even fashion. The pivoting action of vertical rigid spine 58 around hinge pins 40, 42 provides the proper seating of valve 7 by directing the downward force along the natural downward rotational movement of valve 7. As mentioned above, vertical rigid spine 58 is adjusted to pivot in the same direction as valve 7 by suitable positioning locking hanger 36 at eye 38.

Figure 11:
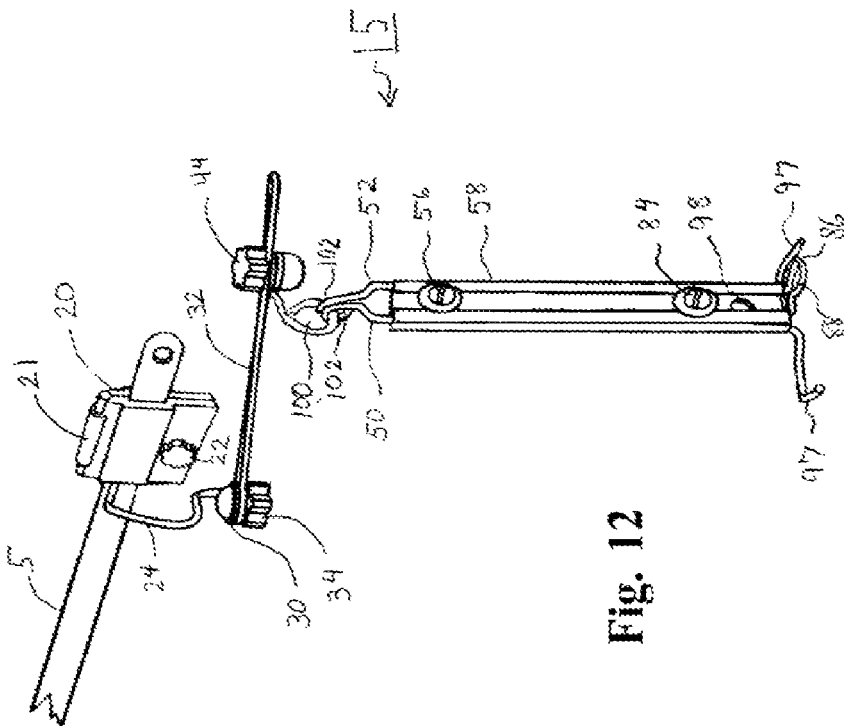
FIG. 11 is an embodiment of a flush valve control mechanism formed in accordance with the present invention including a vertical rigid spine member directly connected to flush handle extension component.
Figure 12:
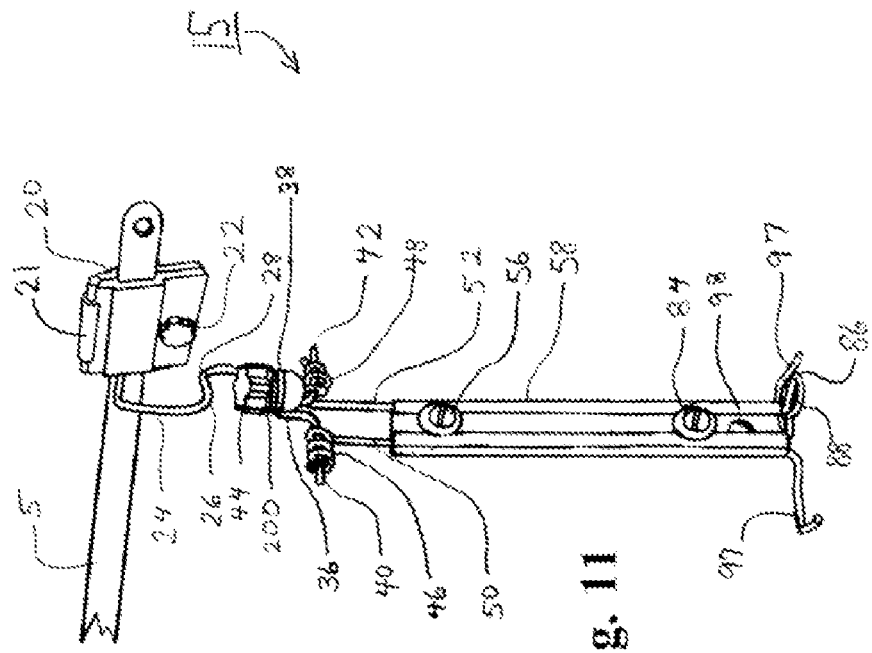
FIG. 12 is an embodiment of a flush valve control mechanism formed in accordance with the present invention including a vertical rigid spine member and a lateral extension arm.

For the sake of clarity, FIGS. 11 and 12 illustrate various aspects of the present invention by the illustration of flush valve control mechanism 15 with only a portion of flush handle extension 5 (the remaining standing flush components not shown in these views).

FIG. 11 illustrates an exemplary embodiment of mechanism 15 where vertical rigid spine 58 is directly connected to clamp arm 24 (that is, without the use of extension arm 32). In this case, a locking screw 200 used to attach hanger 36 to clamp arm 24. The rotational movement of vertical spine 58 is retained in this embodiment.

FIG. 12 shows an embodiment of flush valve control mechanism 15 utilizing lateral extension arm 32 in conjunction with vertical rigid spine 58. As described above, vertical rigid spine 58 is slidably attached to lateral extension arm 32 via hanger 36 and locking screw 44. This particular embodiment of lateral extension arm 32 and vertical rigid spine 58 provides a means for adjusting the position of spine 58 with respect to valve 7, that is, to be directly above valve 7. This proper positioning allows for vertical rigid spine 58 to urge valve 7 directly downward onto valve seat 10 (not shown) for a variety of full-flush conventional architectures, facilitating positive value closure regardless of the details of the individual designs. In this particular embodiment, hanger 36 terminates at its lower end as a vertical eye 100. Vertical rigid spine 58 then attaches to hanger via 36 via spine extender arms 50, 52 which in this case terminate as closed loops 102 through eye 100. This embodiment does not restrict the rotational movement of vertical spine 58 to the rotational plane of valve 7.

Figure 13:
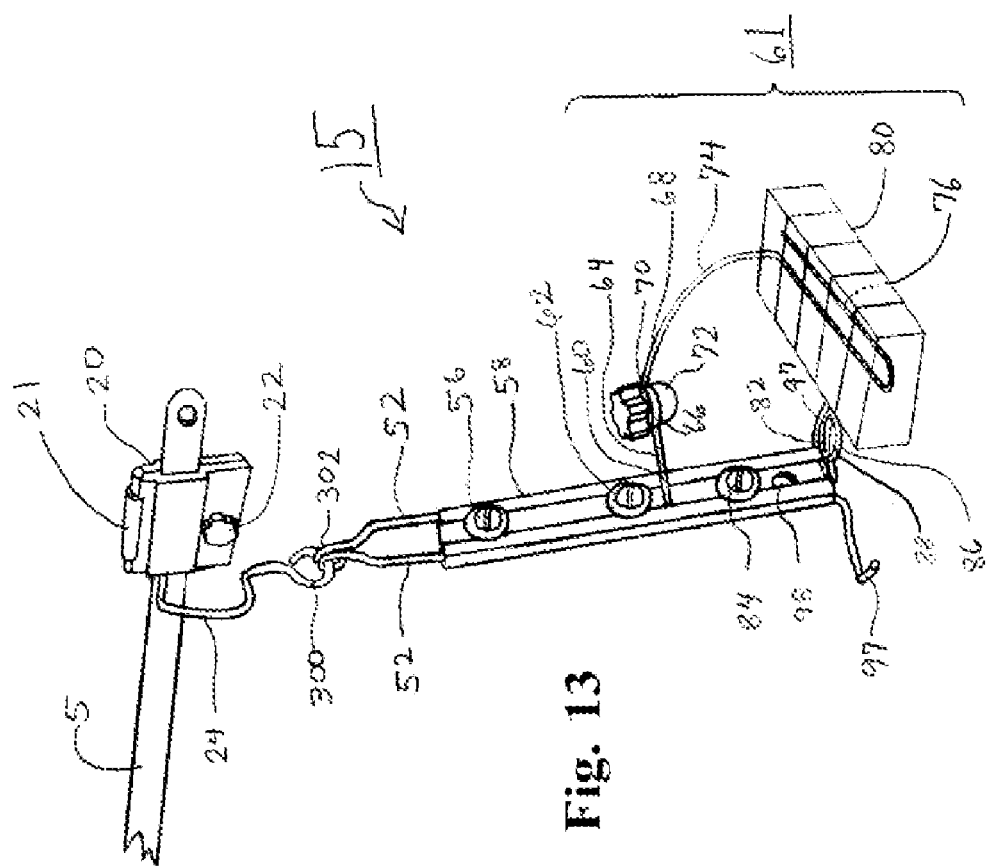
FIG. 13 shows yet another embodiment of a flush valve control mechanism of the present invention, in this case including a buoyant apparatus.

FIG. 13 shows an embodiment of flush valve control mechanism 15 incorporating buoyant member 61, comprising float arm bracket 60. As shown, bracket 60 is slidable to a preselected fixed attachment point along vertical rigid spine 58 via locking screw 62 and includes lateral bend 64, eye 66, float arm 68, eye 70, locking screw 72, arc 74, float retainer section 76 and sectional floats 80. In this arrangement, clamp arm 24 terminates at its lower end as a vertical eye 300, where vertical rigid spine 58 attaches to clamp 24 via extender arms 50, 52 that terminate as closed loops 302 through eye 300. Preferably, buoyant member 61 is disposed such that sectional floats 80 are at the same level as valve 7, providing a full counterbalance associated with the weight of the inventive mechanism while maintaining the desired flush volume of water.

From the above descriptions, a number of advantages of the present invention become evident. First, the user need not learn a new procedure to initiate a full flush. As with the standard single-flush toilet, the user simply presses the flush handle downward and releases. Additionally, initiating a partial flush in accordance with the present invention requires no new knobs, handles or levers, but instead is initiated by simply returning the pre-existing handle upward to its original pre-flush position. The installation of flush valve control mechanism 15 of the present invention requires no tools, special expertise or alterations to the standard toilet architecture. No additions, replacements, substitutions or temporary disconnection/removal of pre-existing components are required, and only one fixed point of connection (to the easily-accessible flush handle extension 5) is required. The flush control unit of the present invention installs as a single unit which, when adjusted for the manufacturer's specific toilet design, has only one point of movement (pivotability of vertical rigid spine 58 at hinge pins 40, 42), allowing for operational reliability and economy of manufacture. The principles and design of the present invention provide adjustment features that allow for compatibility of fit within a wide variety of tank configurations.

The principles and design of the present invention also promotes reliable positive valve seating across various toilet architectures by urging the pivoting buoyant valve downward along its natural rotational path towards its valve seat. Moreover, the arrangement of the present invention does not require the relocation of the valve away from the bottom of the tank, taking full advantage of the pressure column within the tank in forcefully clearing waste from the toilet bowl. This further promotes water conservation by allowing the user to utilize a partial flush for solid waste conditions that do not require a full flush.

The user, in addition to selecting either a full flush or a partial flush, is given full control in selecting the amount of water to use in the partial flush. This control during the partial flush further promotes water conservation beyond the prior art "two-stage" flush (i.e., full or partial), by allowing the user to select any desired reduced amount of water that may be intermediate to the low and high flush volumes of the prior art two-stage toilets, for removing types and volumes of solid waste material that do not require a full flush. Additionally, the user can further conserve the water volume consumed during a full flush when the factory pre-set full-flush volume is found to be greater than typically required for a complete evacuation of waste.

Although the above description contains many specificities, these should not be construed as limiting the scope of the present invention. For example, illustrated components fabricated of non-corrosive wire may alternatively comprise materials such as plastic or the like; locking screws at pivot areas may be replaced by other fastening hardware or methods, such as self-locking joints that "click-stop" into various pivot positions when manually rotated. Similarly, locking screws such as at slidable connections may be replaced with click-stop connections, or with release tabs for disengaging locking teeth between slidably connecting components or the like. Additionally, the pivot joint formed by hinge barrels 46 and 48 surrounding hinge pins 40 and 42 may be substituted by alternative pivot arrangements such as, but not limited to, two interfacing disks rotating in relation to each other around a fastener connecting their centers.

Indeed, the above description is considered to be explanatory of the nature of the present invention and the scope of the invention is intended to be limited only by the claims appended hereto.

What is claimed is:

1. A water-conserving flush valve control mechanism for a toilet of the type generally having a water reservoir, an outflow orifice that discharges into a toilet bowl located below, a pivotally operated flapper valve seated on said outflow orifice, a flush handle disposed external to the water reservoir, a flush handle extension disposed within the reservoir and coupled to the flush handle, and an original linkage disposed between the flush handle extension and the flapper type valve to control the movement of the flapper valve with respect to said outflow orifice by operation of the flush handle, the water conserving flush valve control mechanism comprising:

an add-on linkage disposed between the flush handle extension and the flapper valve for urging the valve directly downward along its natural arc of motion by returning the flush handle to its original pre-flush position, regardless of the location of the valve along the base of the reservoir, the add-on linkage further comprising:

a vertical rigid spine including an upper end termination and a lower end termination, the lower end termination contacting the flapper valve and encircling the original linkage to allow for free movement of said linkage, the vertical rigid spine configured to urge said flapper valve into contact with said outflow orifice when the flush handle is moved toward its original pre-flush position;

a lateral extension arm including first and second end terminations, the second end termination coupled through a rotatable pivot connection arrangement to the upper end termination of the vertical rigid spine, the rotatable pivot connection configured to confine the pivoting movement of the vertical rigid spine to follow the natural arc of motion of the flapper valve;

wherein the rotatable pivot arrangement of the lateral extension arm and vertical spine is configured to be adjustable in position along the length of the lateral extension arm; and a clamping arrangement for attaching the first end termination of the lateral extension arm to the flush handle extension through a horizontally rotatable attachment that can be locked at any position of horizontal rotation, the horizontally rotatable attachment providing lateral displacement of the vertical rigid spine and ensuring proper location of said vertical rigid spine directly above the flapper valve.

2. A water-conserving flush valve control mechanism as defined in claim 1 wherein the add-on linkage for urging the flapper-type valve downward is adjustable to different distances between the flush handle extension and flapper-type valve, the adjustable linkage comprising a pair of extender arms telescoping from the upper termination of the vertical rigid spine, and said extender arms engaging with the lateral extension arm rotatable pivot connection.

3. A water-conserving flush valve control mechanism as defined in claim 2 wherein the pivoting component of the rotatable pivot connection comprises a pair of hinge pins and the pair of extender arms is formed to include horizontal barrel extensions that engage with the pair of hinge pins to form the pivot connection.

4. A water-conserving flush valve control mechanism as defined in claim 3 wherein the rotatable component of the pivoting arrangement between the hinge pins and lateral extension arm is configured to provide alignment of the hinge pins with the natural arc of motion of the flapper-type valve, wherein said rotatable component is capable of being locked at any point of rotation to maintain said alignment.

5. A water-conserving flush valve control mechanism as defined in claim 1 wherein the rotatable pivot arrangement is configured to be lockable in position.

\* \* \* \* \*